US009351361B2

(12) United States Patent
Teufel

(10) Patent No.: US 9,351,361 B2
(45) Date of Patent: May 24, 2016

(54) DRIVER CIRCUIT FOR LIGHT-EMITTING DIODES

(71) Applicant: ams AG, Unterpremstätten (AT)

(72) Inventor: Mario Teufel, Gratwein (AT)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 14/372,442

(22) PCT Filed: Nov. 28, 2012

(86) PCT No.: PCT/EP2012/073858
§ 371 (c)(1),
(2) Date: Jul. 15, 2014

(87) PCT Pub. No.: WO2013/107549
PCT Pub. Date: Jul. 25, 2013

(65) Prior Publication Data
US 2015/0008837 A1 Jan. 8, 2015

(30) Foreign Application Priority Data

Jan. 17, 2012 (DE) .......................... 10 2012 100 352

(51) Int. Cl.
*H05B 33/08* (2006.01)
*G03B 15/05* (2006.01)
(Continued)

(52) U.S. Cl.
CPC ............ *H05B 33/0818* (2013.01); *G03B 15/05* (2013.01); *H02M 3/158* (2013.01); *H05B 33/0815* (2013.01); *H05B 33/0821* (2013.01);
(Continued)

(58) Field of Classification Search
None
See application file for complete search history.

(56) References Cited

U.S. PATENT DOCUMENTS

| 7,969,121 | B2 | 6/2011 | Smith et al. |
| 2006/0043938 | A1* | 3/2006 | O'Gorman ........... B60Q 11/005 322/8 |
| 2008/0129219 | A1* | 6/2008 | Smith ................. H02M 3/1584 315/291 |

(Continued)

FOREIGN PATENT DOCUMENTS

| DE | 102005030123 A1 | 1/2007 |
| DE | 102007014398 A1 | 10/2008 |
| DE | 102009018098 A1 | 10/2010 |

OTHER PUBLICATIONS

Anonymous, "Charge-Pump and Step-Up DC-DC Converter Solutions for Powering White LEDs in Series or Parallel Connections", Internet citation, Apr. 23, 2012, XP002440940 URL: http://www.maxim-ic.com/appnotes.cfm/appnote_number/1037/CMP/WP-33.

*Primary Examiner* — Crystal L Hammond
(74) *Attorney, Agent, or Firm* — McDermott Will & Emery LLP

(57) ABSTRACT

In one embodiment, a driver circuit for light-emitting diodes has a first DC/DC converter (DCDC1) with an input (IN) for feeding a supply voltage (VBAT) and with a first output (OUT), a second DC/DC converter (DCDC2), which is coupled on the output side to the first output (OUT) and is designed for operation with energy supplied in advance, a current source (IFlash) that is connected to the first output (OUT), and a main output (LED_OUT), which is coupled to the current source (IFlash) and is designed to be connected to the light-emitting diodes. The first DC/DC converter (DCDC1) is designed for operation in a current-limiting mode. The second DC/DC converter (DCDC2) is designed for regulation to a nominal voltage (Vds) of the current source (IFlash).

11 Claims, 5 Drawing Sheets

(51) Int. Cl.
*H02M 3/158* (2006.01)
*H02M 1/00* (2006.01)

(52) U.S. Cl.
CPC ...... *H02M 2001/0087* (2013.01); *Y02B 20/347* (2013.01)

(56) References Cited

U.S. PATENT DOCUMENTS

| | | | |
|---|---|---|---|
| 2009/0066262 A1 | 3/2009 | Tateishi et al. | |
| 2009/0108775 A1* | 4/2009 | Sandner | H05B 33/0827 315/297 |
| 2009/0121644 A1* | 5/2009 | Sandner | H05B 33/0812 315/241 P |
| 2009/0206772 A1* | 8/2009 | Bayer | H02M 3/1582 315/294 |
| 2010/0128472 A1* | 5/2010 | Hancock et al. | 362/231 |
| 2010/0134038 A1* | 6/2010 | Shackle | H05B 33/0815 315/291 |
| 2011/0080118 A1* | 4/2011 | Daniel | H05B 33/0815 315/297 |
| 2011/0148318 A1* | 6/2011 | Shackle | H05B 33/0815 315/291 |
| 2011/0148324 A1* | 6/2011 | Du | H05B 33/0812 315/297 |
| 2013/0002165 A1* | 1/2013 | Rouvala | H05B 33/0815 315/294 |
| 2013/0313996 A1* | 11/2013 | Williams | H02M 3/158 315/291 |

\* cited by examiner

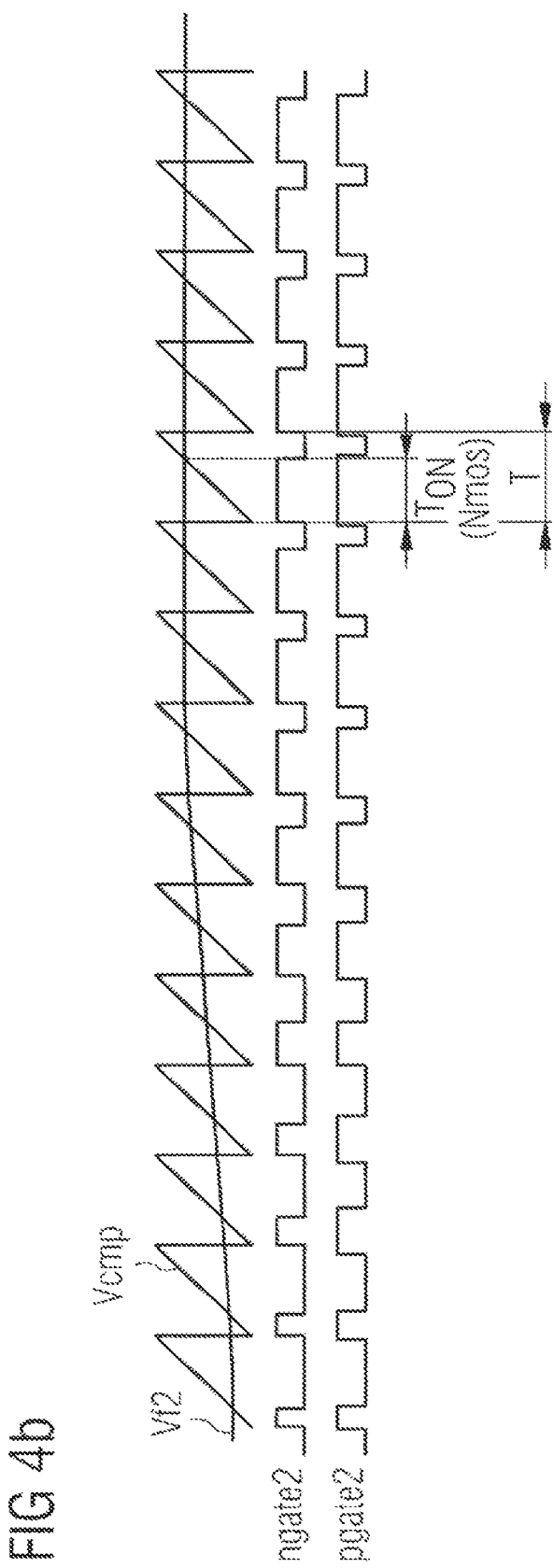

DRIVER CIRCUIT FOR LIGHT-EMITTING DIODES

The invention relates to a driver circuit for light-emitting diodes.

Driver circuits for light-emitting diodes are used in a variety of applications. The use that is the subject matter of this application is the operation of a flash unit. Photoflash light-emitting diodes are used for this purpose. In order to generate a flash of a given brightness, it can be advisable, considering the currently available photoflash light-emitting diodes, to trigger two diodes simultaneously.

The application proceeds from a circuit with which two photoflash light-emitting diodes are operated in parallel. For this purpose, two current sources are included in each current path of a photoflash light-emitting diode, photoflash LED. One respective current source is fed by a DC/DC converter that is triggered with a supply voltage, from a battery for example. The respective second current source is operated by means of a capacitor charged in advance. The current for the photoflash LED results from the sum of the currents provided by the first and second current source. Knowledge of the level of the energy available from the battery is necessary in order to adjust the level of the respective individual currents. The level of the current from the second current source can be adjusted on this basis. This requires an extensive effort for advance measurements and adjustments based thereon. Regulation is necessary in both the DC/DC converters.

One problem is to specify an improved driver circuit in comparison to the above.

The problem is solved by the driver circuit for light-emitting diodes of claim 1. Refinements and configurations are the subject matter of the dependent claims.

In one embodiment, a driver circuit for light-emitting diodes has a first DC/DC converter with an input for feeding a supply voltage and with a first output, a second DC/DC converter, which is coupled on the output side to the first output and is designed for operation with energy supplied in advance, a current source that is connected to the first output, and a main output, which is coupled to the current source and is designed to be connected to the light-emitting diodes. The first DC/DC converter is designed for operation in a current-limiting mode. The second DC/DC converter is designed for regulation to a nominal voltage of the current source. The driver circuit is designed for operation in a flash mode. In this mode, a flash is initiated with the aid of the light-emitting diodes, for which a constant power for the light-emitting diodes is provided at the main output for the duration of the flash.

By coupling the outputs of the first and second DC/DC converters, both converters operate for the first output. This first output operates the current source with which the light-emitting diodes are driven. The first DC/DC converter is operated in the current-limiting mode in which a current at a precisely defined level is fed via the supply voltage from a connectible energy source such as a voltage source. The second DC/DC converter regulates to the nominal voltage of the current source. Thereby, depending on a duty ratio of the first DC/DC converter, more or less of the current required for the light-emitting diodes is provided by the first DC/DC converter, while the rest of the required energy is supplied by the second DC/DC converter.

Consequently the driver circuit is advantageously self-regulating. By virtue of the fact that the level of the current is limited to a fixed value in the current-limiting mode, the advance measurements and calculations necessary in the above-described prior art are advantageously no longer required. A regulation of the first DC/DC converter is considerably simplified. Since both DC/DC converters operate toward the first output, only one capacitor is necessary at this output, which leads to a reduction of the material costs for the driver circuit, including external components.

The nominal voltage of the current source is the voltage that is present at or drops across the current source during operation thereof.

The power required for triggering the flash is supplied in a constant manner by the first DC/DC converter in cooperation with the second DC/DC converter.

In a refinement, the first and second DC/DC converters are each operated at a constant frequency.

In one example, the first and second DC/DC converters are operated at the same frequency.

In another embodiment, a voltage provided at the main output is a difference of a voltage provided at the first output and the nominal voltage of the current source.

In a refinement, the light-emitting diodes to be operated are photoflash light-emitting diodes that are connected to one another in series and are referenced to a reference potential terminal.

Due to the series connection of the diodes, the voltage provided at the first output is normally higher than the infed supply voltage. Consequently the first DC/DC converter can be operated in current-limiting mode. Thus the further regulation of the first DC/DC converter that was required in the prior art is unnecessary, which allows a purely digital control of the first DC/DC converter.

In a refinement, the first DC/DC converter has a first inductive storage unit, which is connected to the input, a first capacitive storage unit, which is connected to the first output and the reference potential terminal, a first control unit, a measuring unit and a first and a second switch. The first switch is connected to the first inductive storage unit, the first control unit and the reference potential terminal. The second switch is connected to the first inductive storage unit, the first control unit and the first capacitive storage unit. The measuring unit is coupled to the first switch and the first control unit and is designed to detect a level of a current through the first switch.

Under the control of the first control unit and depending on a duty ratio of the first DC/DC converter, the first inductive storage unit is alternately charged by the infed supply voltage with the first switch closed and then, with the second switch closed, the energy stored in the first inductive storage unit is transferred to the first capacitive storage unit and the first output, in accordance with the known functional principle of a DC/DC converter. The current through the first switch detected by the measuring unit is a measure of a current through the first inductive storage unit and thus represents the current drawn from the energy source by means of the supply voltage.

In a refinement, the first control unit is designed to limit the current through the first switch to an adjustable maximum value and to provide corresponding control signals for the first and second switches.

The first control unit monitors the current through the first switch that is detected by the measuring unit and adapts the duty ratio of the first DC/DC converter with the aid of the first and second switches in such a manner that the adjustable maximum value for the current through the first switch is not exceeded. Thereby the first DC/DC converter is operated in current-limiting mode.

In another embodiment, the second DC/DC converter has a second control unit, a third switch, which is connected to the first output and the second control unit, a fourth switch, which is connected to the third switch, the second control unit and the reference potential terminal, a second inductive storage unit and a second capacitive storage unit. The second inductive storage unit is coupled between the third and fourth switches. The second capacitive storage unit is connected to the second inductive storage unit and the reference potential terminal.

The second capacitive storage unit is charged in advance, i.e. before triggering a flash. In flash mode, the second capacitive storage unit functions similar to a battery with the stored charge. According to the known functional principle of a DC/DC converter, third and the fourth switches are closed alternately by the second control unit, so that the energy stored in the second capacitive storage unit is transferred to the second inductive storage unit and subsequently to the first output.

In a refinement, the second control unit is designed to provide control signals for the third and fourth switches on the basis of the regulation of the current source to the nominal voltage.

The nominal voltage of the current source is used by the control unit as a control parameter in order to adapt the duty ratio for the second DC/DC converter by appropriate trigger signals for the third and fourth switches.

In another embodiment, the second control unit has a proportional-integral controller.

In a refinement, the second capacitive storage unit has a series circuit comprising two capacitors.

In another embodiment, the two capacitors each have a supercapacitor.

Because of the energy required in flash mode, two supercapacitors are connected in series for storing the required energy. A supercapacitor has a high capacitance value in a small area and a low internal resistance. This is particularly advantageous in the application as an interim storage for charge for a photoflash light-emitting diode.

In a refinement, the driver circuit comprises precisely the one current source.

In this embodiment, no additional current source is provided in the current path for the light-emitting diodes to be operated.

BRIEF DESCRIPTION OF THE DRAWINGS

The invention will be described in detail below on the basis of embodiments with reference to the figures. Components and circuit elements that are functionally identical or have the identical effect bear identical reference numbers. Insofar as circuit parts correspond to one another in function, a description thereof will not be repeated in each of the figures. In the drawings:

FIG. 4B shows signal diagrams for the embodiment of FIG. 4A.

DETAILED DESCRIPTION

Figure 1:
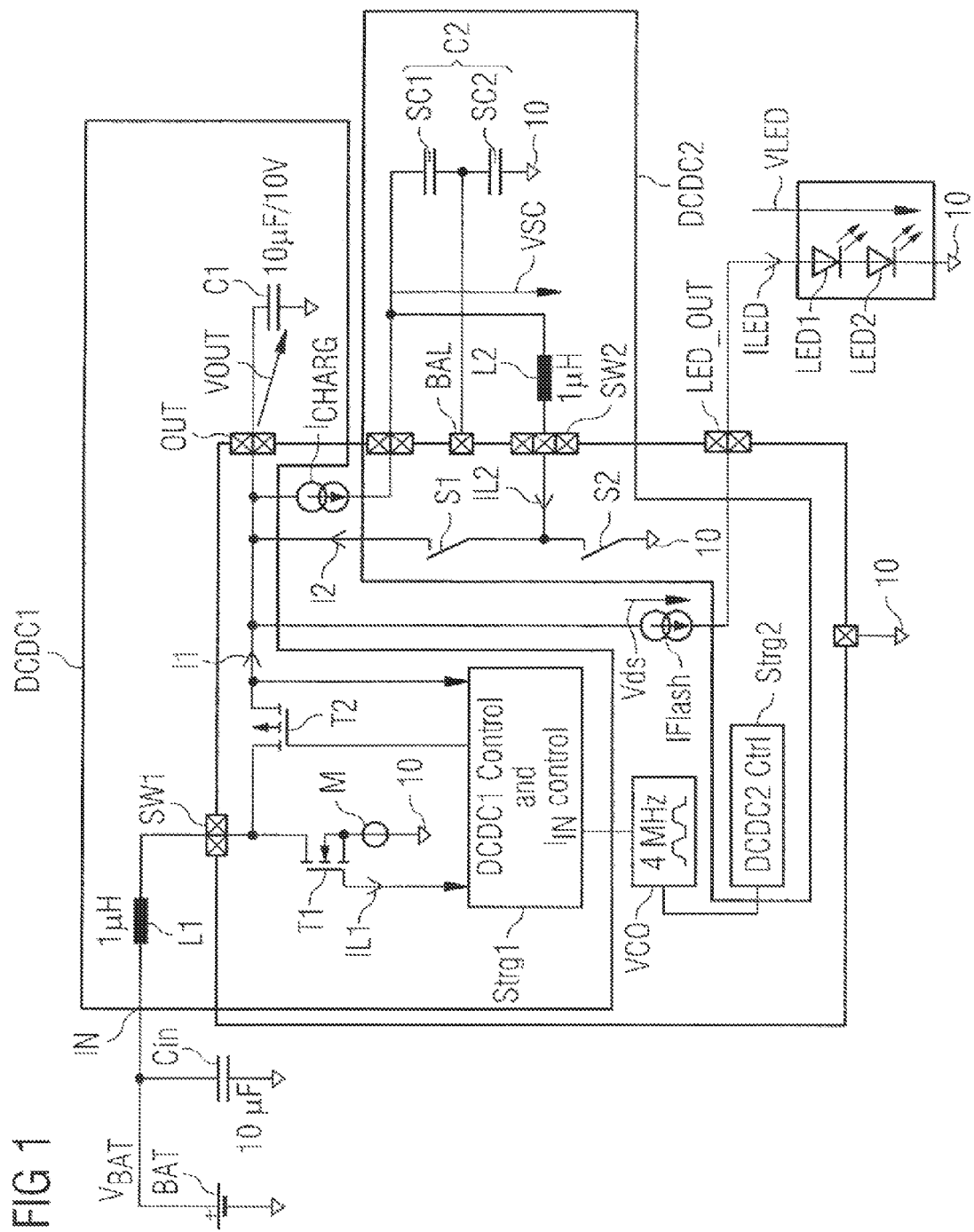
FIG. 1 shows an embodiment example of a driver circuit according to the proposed principle.

FIG. 1 shows an embodiment example of a driver circuit according to the proposed principle. The driver circuit comprises an input IN for feeding a supply voltage VBAT, a first DC/DC converter DCDC1 with a first output OUT, a second DC/DC converter DCDC2, a current source IFlash, and a main output LED_OUT. One output of the second DC/DC converter DCDC2 is connected to the first output OUT. The current source IFlash is connected at one terminal to the first output OUT and at the other terminal to the main output LED_OUT. The supply voltage VBAT is supplied by an energy source BAT, for example a voltage source such as a lithium-ion battery, and is fed via an input capacitor Cin to the input IN. Two light-emitting diodes LED1, LED2 can be connected as shown to the main output LED_OUT. The two light-emitting diodes LED1, LED2 are each designed as a photoflash light-emitting diode. The light-emitting diodes LED1 and LED2 are connected in series to one another and are connected to a reference potential terminal 10.

The first DC/DC converter DCDC1 comprises a first inductive storage unit L1, a first capacitive storage unit C1, a first switch T1, a second switch T2, a first control unit Strg1 and a measuring unit M. The first inductive storage unit L1 is connected between the input IN and a terminal SW1 and is thus coupled on the one hand to the supply voltage VBAT and on the other to the first switch T1 and the second switch T2. The first switch T1 is implemented here as an NMOS transistor for the sake of example. The gate terminal of the transistor is coupled to the first control unit Strg1. A drain terminal of the first switch T1 is connected via the terminal SW1 to the first inductive storage unit L1; a source terminal of the first switch T1 is connected to the measuring device M. The measuring device M is referenced to the reference potential terminal 10 and is connected to the first control unit Strg1. The measuring unit M detects a current IL1 through the first switch T1. The second switch T2 is implemented as a PMOS transistor, for example, the gate terminal of which is connected to the first control unit Strg1. A drain terminal of the second switch T2 is connected via the terminal SW1 to the first inductive storage unit L1. A source terminal of the second switch T2 is connected to the first output OUT. The first capacitive storage unit C1 is connected on the one hand to the first output OUT and on the other to the reference potential terminal 10. A voltage VOUT is present at the first capacitive storage unit C1.

The second DC/DC converter DCDC2 comprises a second capacitive storage unit C2, a second inductive storage unit L2, a third switch S1, a fourth switch S2 and a second control unit Strg2. The third switch S1 is connected on the one hand to the first output OUT and on the other to the fourth switch S2. The fourth switch S2 is connected to reference potential terminal 10. The third and fourth switches S1, S2 are each coupled to the second control unit Strg2 for driving. The second capacitive storage unit C2 is referenced on the one hand to the reference potential terminal 10 and on the other hand is connected to the second inductive storage unit L2. The other terminal of the second inductive storage unit L2 is coupled to a node point SW2 between the third and the fourth switches S1, S2. The switches S1, S2 are likewise realized as MOS transistors. The fourth switch S2 is designed as an NMOS transistor, while the third switch S1 is realized as a PMOS transistor. The second capacitor storage unit C2 is implemented by a series connection of two capacitors SC1, SC2. The capacitors SC1, SC2 are designed as supercapacitors for the sake of example.

The second capacitive storage unit C2 is charged in advance to a voltage VSC.

Also shown is a frequency generator VCO that is connected to the first and the second control units Strg1, Strg2 and provides the same respective constant frequency for each of the two DC/DC converters DCDC1, DCDC2.

A further current source ICharge is additionally shown, which is needed for charging the second capacitor C2 in advance to the voltage VCS. The charging is monitored via a terminal BAL, so that overcharging of one of the two supercapacitors SC1 or SC2 is avoided.

The driver circuit shown is operated in a flash mode. The second capacitive storage unit C2 is already charged, so that the current source ICharge is switched off in the flash mode. In this mode, the light-emitting diodes LED1, LED2 configured as photoflash LEDs are triggered such that a flash is initiated. For this purpose, a high-power is provided in a constant manner at the main output LED_OUT. In this mode, the two DC/DC converters DCDC1, DCDC2 operate to the same output, namely the first output OUT.

The first DC/DC converter DCDC1 is operated in a current-limiting mode. This means that a current supplied by the energy source BAT is limited to an adjustable maximum value. This is achieved by continuous measurement of the current IL1 through the first switch T1 by means of the measuring unit M and a driving of the first and second switches T1, T2 oriented thereto. The duty ratio of the first DC/DC converter DCDC1 is thus adapted appropriately by the first control unit Strg1. The first DC/DC converter DCDC1 therefore supplies a current I1.

The second DC/DC converter DCDC2 regulates to a nominal voltage Vds of the current source IFlash. The second DC/DC converter DCDC2 operates with the energy that was stored in the second capacitive storage unit in advance, i.e. before activation of the flash mode. The second control unit Strg2 controls the duty ratio of the second DC/DC converter DCDC2 depending on the nominal voltage Vds of the current source IFlash, which serves as the control variable. The second DC/DC converter DCDC2 supplies a current I2.

Consequently, a voltage VLED, which is a difference between the voltage VOUT provided at the first output and the nominal voltage Vds of the current source IFlash, is provided at the main output LED_OUT. The voltage VLED is also the sum of the voltages dropping at the two light-emitting diodes LED1 and LED2. The energy provided at the main output results from the product of the voltage VLED and a current ILED. The proportion of energy that is supplied by the first DC/DC converter DCDC1 is limited according to the current-limiting mode to a fixed value, while the remaining required energy is provided by the second DC/DC converter DCDC2 in a self-regulating manner.

Due to the coupling of the two DC/DC converters DCDC1 and DCDC2 according to the invention, there is the advantageous result that only a single current source IFlash is required in the current path of the photoflash LEDs LED1, LED2 in order to generate a flash with the desired brightness. In addition, the realization of the first control unit Strg1 is considerably simplified by the current-limitation mode of the first DC/DC converter DCDC1, because only the current IL1 has to be monitored.

In one possible realization of the driver circuit, the first and second control units Strg1, Strg2, the frequency generator VCO, the switches T1, T2, S1, S2 and the current sources IFlash and ICharge are implemented on a chip. The other components are connected externally to this chip.

Figure 2A:
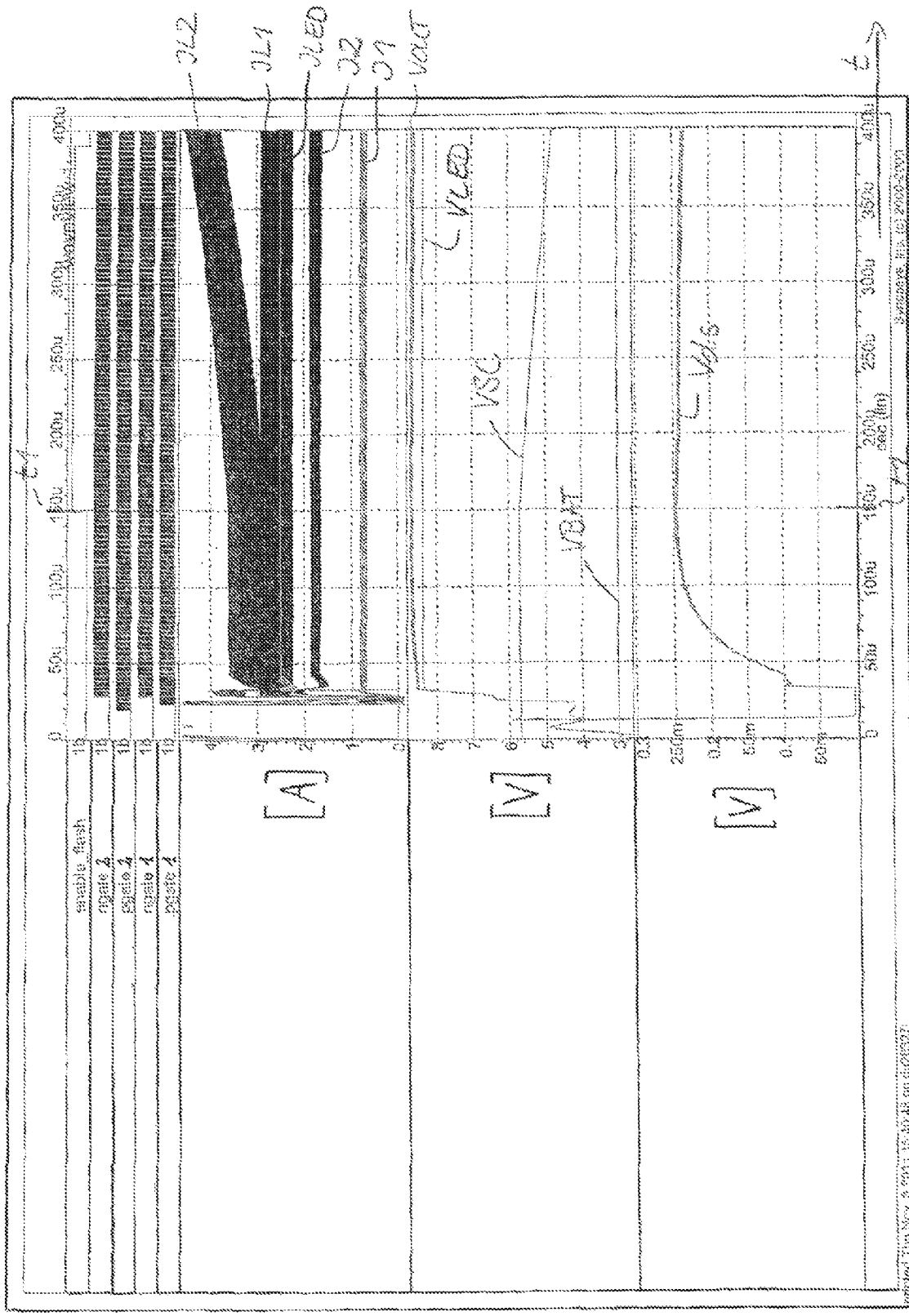
FIGS. 2A and 2B show signal diagrams for the embodiment of FIG. 1.

FIG. 2A shows signal diagrams for the driver circuit of FIG. 1. The various signals are based on a simulation and are shown together in relationship to a time t. From top to bottom, the lines show five digital control signals, the curves of various currents and the curves of various voltages. The digital control signals are: enable_flash for activating flash mode, a control signal ngate2 provided by the control unit Strg2 of FIG. 1 for the fourth switch S2, a control signal pgate2 for the third switch S1, also provided by the control unit Strg2, a control signal ngate1 provided for the first switch T1 by the first control unit Strg1 and a control signal pgate1 provided for the second switch T2, likewise by the control unit Strg1. Details of the digital control signals, especially for the switches T1, T2, S1, S2, can be seen in FIG. 2B.

The illustrated currents shown are: a current IL2 through the second inductive storage unit L2 of the second DC/DC converter DCDC2, the current IL1 through the first inductive storage unit L1 of the first DC/DC converter DCDC1, the current ILED, which flows through the light-emitting diodes LED1, LED2, a current I2, which represents the current contribution of the second DC/DC converter DCDC2 to the current ILED, and a current I1, which corresponds to the current contribution of the first DC/DC converter DCDC1 to the current ILED.

The voltages shown are: the voltage VOUT at the first output OUT, the voltage VLED at the main output LED_OUT, the voltage VSC that drops at the second capacitive storage unit C2 and the supply voltage VBAT. The bottom diagram shows the curve of the nominal voltage Vds at the current source IFLASH.

Before a time t1, the second capacitive storage unit C2, i.e. the supercapacitors SC1 and SC2 thereof, is substantially charged to the desired value, here approximately 5.8 V. The nominal voltage Vds of the current source is adjusted to a desired value of 250 mV, for example. In a stabilized state, all the other voltages and currents each reach a stable state before time t1, so that stable relationships exist in the driver circuit for triggering the flash.

At time t1, the flash mode is activated with the aid of the signal enable_flash. The voltage VSC at the second capacitive storage unit C2 decreases. Nevertheless, the voltage VLED provided at the main output remains constant. The nominal voltage Vds of the current source is controlled to the value of 250 mV. The voltage VOUT at the first output is adjusted as follows:

$$VOUT = VLED + Vds$$

VOUT here represents the value of the voltage VOUT, VLED the value of the voltage VLED and Vds the value of the nominal voltage Vds.

Because the voltage VSC decreases, the current IL2 consequently increases. It can be clearly recognized that the current IL1 remains constant due to the current-limiting mode of the first DC/DC converter DCDC1. The current ILED also remains constant, whereby a constant power is provided at the main output.

With respect to the signal, it should be noted that the time axis was scaled by a factor of 1/275, which means that 1 μsec on the time axis actually corresponds to 275 μsec.

In the illustrated simulation, the DC/DC converters DCDC1 and DCDC2 are switched on before time t1, i.e. the nominal voltage Vds has been regulated to 250 mV, but the voltage VSC is maintained at the nominal value of 5.8 V until time t1. Energy is not drawn from the supercapacitors SC1 and SC2 until enable_flash has been set to 1, as can be recognized from the drop of the voltage VSC. This was realized for the illustrated simulation in this manner in order to be able to estimate the power loss of the chip as a whole. In an actual case, enable_flash would be set to 1 and only then, within approximately 500 μsec, would the circuit regulate the nominal voltage Vds of the current source to 250 mV. The energy required for this is provided from the beginning by the supercapacitors SC1 and SC2.

Figure 2B:
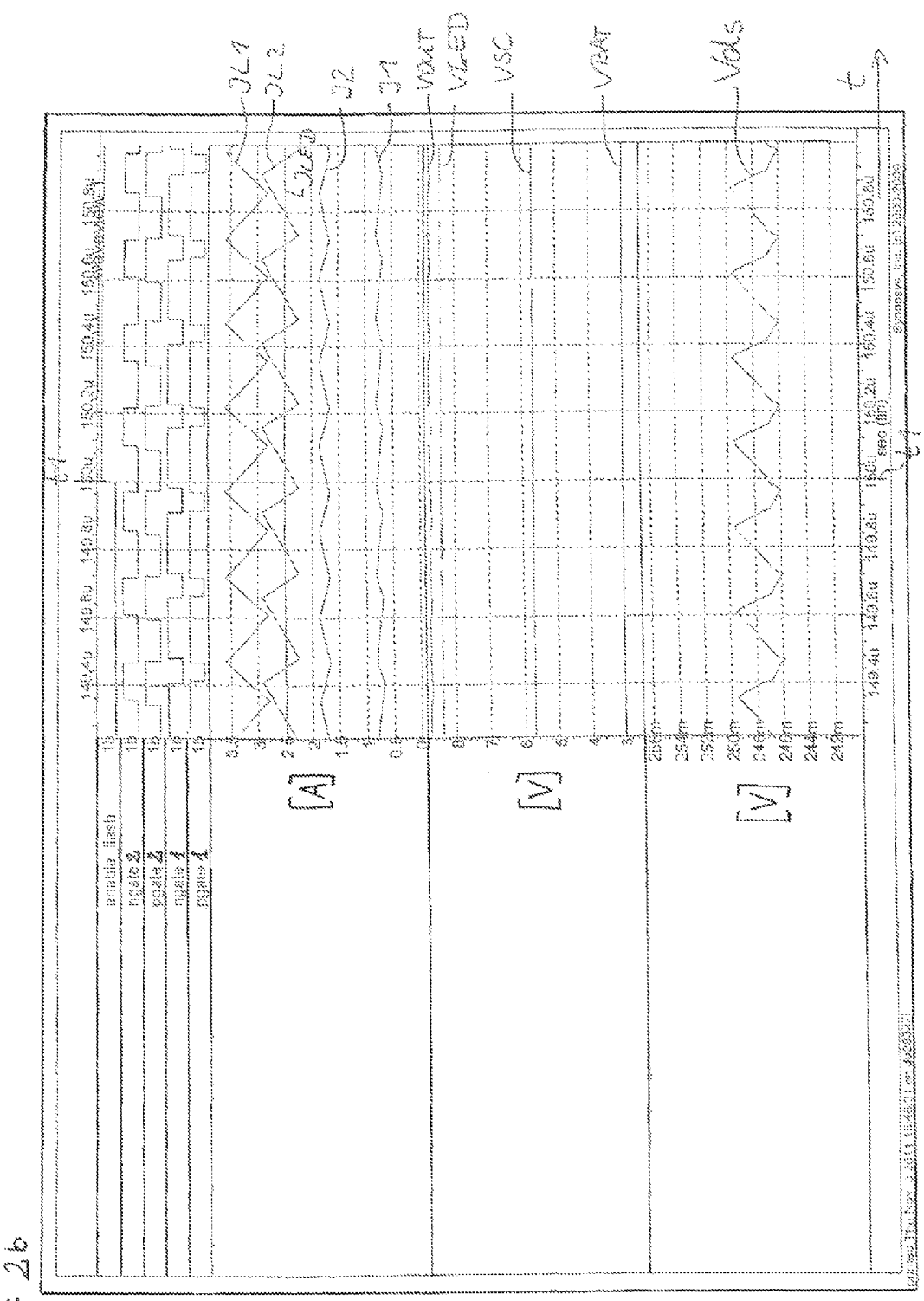

FIG. 2B likewise shows signal diagrams for the driver circuit of FIG. 1, in which the time axis was scaled differently.

The same simulated signals are shown as in FIG. 2A. Due to the temporal scaling, the digital trigger signals ngate2, pgate2, ngate1 and pgate1 are shown in detail. It must be noted that a value of 1 of the signal ngate1 or ngate2 corresponds to a closed switch T1 or S2 and that the value of 1 of the signal pgate1 or pgate2 corresponds to an open switch T2 or S1 due to the proposed realization by means of NMOS or PMOS transistors.

It can be recognized that the two DC/DC converters DCDC1 and DCDC2 are operated shifted in phase by 180° relative to one another. A phase here has a length of 250 nsec for example. This results in a phase shift of 125 nsec. An adaptation of the duty cycles of the two DC/DC converters DCDC1 and DCDC2 to one another can also be discerned.

Figure 3A:
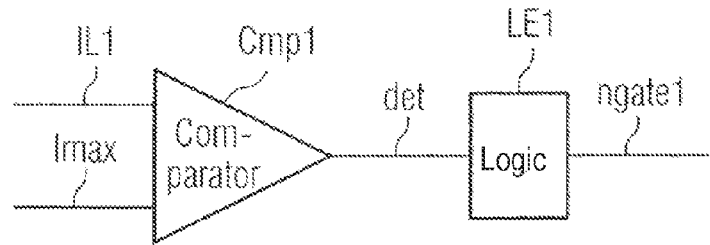
FIG. 3A shows an embodiment for the realization of the current-limiting mode.

FIG. 3A shows an embodiment example for the realization of the current-limiting mode of the first DC/DC converter DCDC1 from FIG. 1. The circuit comprises a first comparator Cmp1 and a logic unit LE1.

The maximum value of the current to which the current drawn from the energy source BAT of FIG. 1 is to be limited is fed to the first comparator Cmp1 in the form of the current Imax and the current IL1 detected with the measuring unit M. As soon as the current IL1 through the first inductive storage unit L1 has reached the level of the current Imax, the output of the first comparator Cmp1 changes over. This event is transmitted to the logic unit LE1 by means of a signal det. From the signal det, this logic unit LE1 generates the trigger signal ngate1 for triggering the first switch T1. This leads to the adjustment of the duty ratio of the first DC/DC converter DCDC1. Expressed in other terms, the regulation implemented in the control unit Strg1 of the first DC/DC converter DCDC1 would demand a longer on-time Ton of the first switch T1, but the signal det causes a premature switch-off of the first switch T1, whereby the current IL1 is limited.

The circuit illustrated in FIG. 3A can be realized inside the first control unit Strg1 of FIG. 1, for example.

Figure 3B:
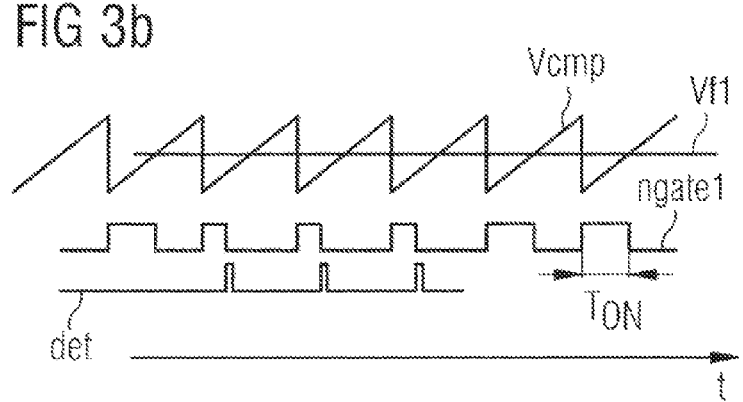
FIG. 3B shows signal diagrams for the embodiment according to FIG. 3A.

FIG. 3B shows signal diagrams for the circuit of FIG. 3A. The curve of a comparison voltage Vcmp and of a first fault voltage Vf1 are shown with reference to time t, as well as the curve of the signal ngate1 and of the signal det. The frequency generator VCO from FIG. 1 generates the sawtooth-shaped comparison voltage Vcmp with a constant frequency. The intersection points of the first fault voltage Vf1 with the rising sawtooth of the comparison voltage Vcmp determine the times for switching off the signal ngate1. If a pulse of the signal det arrives earlier than at these switch-off times, the ngate1 signal goes to 0 earlier and the associated switch is opened earlier. The ngate1 signal is fundamentally clocked to the comparison voltage Vcmp.

During the phase in which the first switch T1 is closed, the following holds for the current IL1 through the first inductive storage unit L1:

$$\Delta IL1 = \frac{VBAT}{L1} * Ton(T1)$$

where ΔIL1 represents the change over time of the current IL1, VBAT the value of the supply voltage VBAT, L1 the value of the inductance of the first inductive storage unit L1 and Ton(T1) the on-period of the first switch T1.

During the phase in which the first switch T1 is opened and the second switch T2 is closed, the following applies for the current IL1:

$$\Delta IL1 = -\frac{VOUT - VBAT}{L1} * Ton(T2)$$

where VOUT represents the value of the voltage VOUT at the first output OUT, and TON(T2) the on-period of the second switch T2.

Figure 4A:
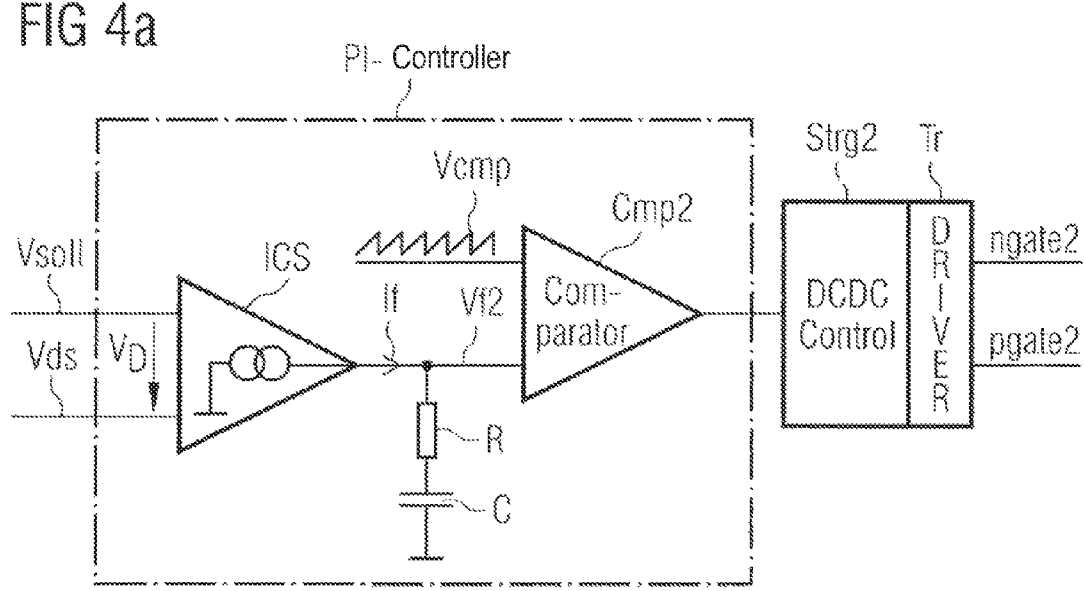
FIG. 4A shows an embodiment example for the regulation of the second DC/DC converter.

FIG. 4A shows an embodiment for the regulation of the second DC/DC converter. The circuit comprises a voltage-controlled current source ICS, a second comparator Cmp2, the second control unit Strg2, a driver unit TR, as well as a resistor R and a capacitor C.

A target value for the nominal voltage Vds of the current source IFlash in the form of the voltage VSoll and the current value of the nominal voltage Vds are fed to the voltage-controlled current source ICS. The difference of the two voltages controls the voltage-controlled current source ICS, which provides a fault current If at its output. This current is amplified at 100 μA/V, for example. The fault current If is integrated by the RC element R, C to form a second fault voltage Vf2. This second fault voltage Vf2 is compared in the second comparator Cmp2 to the comparison voltage Vcmp. The result signal is fed to the second control unit Strg2. The trigger signals ngate2 and pgate2 for the third and the fourth switches S1, S2 are derived from this by means of the driver unit Tr. Because MOS transistors with high capacitance are used for the third and fourth switches, a corresponding current driver is provided, namely the driver unit Tr, which realizes the desired short switching times in the nsec range.

The voltage-controlled current source ICS, together with the RC element and the second comparator Cmp2, realize a proportional-integral (PI) controller. The PI controller can be implemented inside of or outside of the second control unit Strg2.

FIG. 4B shows signal diagrams for the circuit of FIG. 4A. The comparison voltage Vcmp, the second fault voltage Vf2, and the signals ngate2 and pgate2 are shown.

The intersection points of the fault voltage Vf2 with the rising branch of the sawtooth of Vcmp each determine the switch-off times of the signal ngate2. If the signal ngate2 goes to 0, the fourth switch S2 is opened. If the nominal voltage Vds has already reached the target value of VSoll, the value of the fault current If is equal to 0. Thereby the second fault voltage Vf2 remains constant. The on-period of the fourth switch S2 is then likewise constant. The regulator has stabilized. The following holds for the on-period of the fourth switch S2:

$$Ton(S2) = \left(1 - \frac{VBAT}{VOUT}\right) * T;$$

where Ton(S2) represents the on-period of the fourth switch S2 and T the period of the signal pgate2.

LIST OF REFERENCE SYMBOLS

10 Reference potential terminal
T1, T2, S1, S2 Switch
L1, L2 Inductive storage unit
C1, C2 Capacitive storage unit
Strg1, Strg2 Control unit
IFlash, ICharge Current source
IL1, IL2, I1, I2, ILED Current
If Current
VOUT, VBAT, VSoll Voltage Vds, VSC, VLED Voltage
Vcmp1, Vf1, Vcmp2, Vf2 Voltage
M Measurement unit
DCDC1, DCDC2 DCDC converter
SW1, SW2, BAL Connection
Cin, C Capacitor
OUT, LED_OUT Output
SC1, SC2 Supercapacitor
BAT Energy source
enable_flash, det Signal
ngate1, ngate2 Signal
pgate1, pgate2 Signal
Imax Maximum value
Cmp1, Cmp2 Comparator
R Resistor
Tr Driver
IN Input
VCO Frequency generator
LE1 Logic unit
ICS Current source

The invention claimed is:

1. A driver circuit for light-emitting diodes, comprising:
a first DC/DC converter (DCDC1) with an input (IN) for feeding a supply voltage (VBAT) and with a first output (OUT);
a second DC/DC converter (DCDC2), which is coupled on the output side to the first output (OUT) and is designed for operation with energy supplied in advance;
a current source (IFlash), which is connected to the first output (OUT); and
a main output (LED_OUT), which is coupled to the current source (IFlash) and is designed for connecting to the light-emitting diodes;
wherein the first DC/DC converter (DCDC1) is designed for operation in a current-limiting mode and wherein the second DC/DC converter (DCDC2) is designed for regulation to a nominal voltage (Vds) of the current source (IFlash),
wherein the driver circuit is designed for operation in a flash mode, in which a flash is triggered with the aid of the light-emitting diodes, for which a constant power for the light-emitting diodes is provided at the main output (LED_OUT) for the duration of the flash, and
wherein the first DC/DC converter (DCDC1) and the a second DC/DC converter (DCDC2) are designed to operate towards the first output (OUT).

2. The driver circuit according to claim 1,
wherein the first and second DC/DC converters (DCDC1, DCDC2) are operated at a respective constant frequency.

3. The driver circuit according to one of claim 1 or 2, wherein a voltage (VLED) provided at the main output (LED_OUT) is a difference between a voltage (VOUT) provided at the first output (OUT) and the nominal voltage (Vds) of the current source (IFlash).

4. The driver circuit according to one of claim 1 or 2, wherein the light-emitting diodes to be operated are photoflash light-emitting diodes, which are connected in series and are referenced to a reference potential terminal (10).

5. The driver circuit according to one of claim 1 or 2, wherein the first DC/DC converter (DCDC1) comprises the following:
a first inductive storage unit (L1), which is connected to the input;
a first capacitive storage unit (C1), which is connected to the first output (OUT) and the reference potential terminal (10);
a first control unit (Strg1);
a first switch (T1), which is connected to the first inductive storage unit (L1), the first control unit (Strg1) and the reference potential terminal (10);
a second switch (T2), which is connected to the first inductive storage unit (L1), the first control unit (Strg1) and the first capacitive storage unit (C1); and
a measuring unit (M), which is coupled to the first switch (T1) and the first control unit (Strg1) and is designed to detect a level of a current (IL1) through the first switch (T1).

6. The driver circuit according to claim 5,
wherein the first control unit (Strg1) is designed to limit the current (IL1) through the first switch (T1) to an adjustable maximum value (Imax) and to provide corresponding control signals for the first and second switches (T1, T2).

7. The driver circuit according to one of claim 1 or 2, wherein the second DC/DC converter (DCDC2) comprises the following:
a second control unit (Strg2);
a third switch (S1), which is connected to the first output (OUT) and the second control unit (Strg2);
a fourth switch (S2), which is connected to the third switch (S1), the second control unit (Strg2) and the reference potential terminal (10);
a second inductive storage unit (L2), which is coupled to a node point (SW2) between the third and the fourth switches (S1, S2); and
a second capacitive storage unit (C2), which is connected to the second inductive storage unit and the reference potential terminal (10).

8. The driver circuit according to claim 7, wherein the second control unit (Strg2) is designed to provide trigger signals for the third and fourth switches (S1, S2) on the basis of the regulation to the nominal voltage (Vds) of the current source (IFlash).

9. The driver circuit according to claim 7, wherein the second control unit (Strg2) has a proportional-integral controller.

10. The driver circuit according to claim 7, wherein the second capacitive storage unit (C2) has a series circuit comprising two capacitors (SC1, SC2).

11. The driver circuit according to claim 10, wherein the two capacitors (SC1, SC2) each have a supercapacitor.

* * * * *